United States Patent
Sun

(10) Patent No.: US 7,542,275 B2
(45) Date of Patent: Jun. 2, 2009

(54) COMPUTER CASE

(75) Inventor: Zheng-Heng Sun, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/834,019

(22) Filed: Aug. 6, 2007

(65) Prior Publication Data

US 2008/0170363 A1   Jul. 17, 2008

(30) Foreign Application Priority Data

Jan. 12, 2007   (CN) .................. 2007 1 0200049

(51) Int. Cl.
    *G06F 1/16*   (2006.01)
(52) U.S. Cl. .................. 361/683; 361/687; 361/695; 312/223.1
(58) Field of Classification Search .................. 361/687, 361/695, 724–727; 312/223.1, 223.2, 236; 454/184–186
    See application file for complete search history.

(56) References Cited

U.S. PATENT DOCUMENTS

| | | | | |
|---|---|---|---|---|
| 5,839,879 A * | 11/1998 | Kameoka et al. | ............ | 415/206 |
| 5,876,278 A * | 3/1999 | Cheng | ............ | 454/184 |
| 6,042,474 A * | 3/2000 | Harvey et al. | ............ | 454/184 |
| 6,164,369 A * | 12/2000 | Stoller | ............ | 165/104.33 |
| 6,252,770 B1 * | 6/2001 | Yu et al. | ............ | 361/695 |
| 6,285,547 B1 * | 9/2001 | Vigeant et al. | ............ | 361/695 |
| 6,502,628 B1 * | 1/2003 | Siahpolo et al. | ............ | 165/122 |
| 6,579,168 B1 * | 6/2003 | Webster et al. | ............ | 454/184 |
| 7,195,450 B2 * | 3/2007 | Takamatsu | ............ | 415/119 |
| 7,209,350 B2 * | 4/2007 | Merlet et al. | ............ | 361/694 |
| 7,259,963 B2 * | 8/2007 | Germagian et al. | ............ | 361/695 |
| 7,411,788 B2 * | 8/2008 | Liang | ............ | 361/695 |
| 2003/0235035 A1 * | 12/2003 | Wintersteen et al. | ............ | 361/687 |
| 2004/0247431 A1 * | 12/2004 | Chen et al. | ............ | 415/182.1 |
| 2005/0064810 A1 * | 3/2005 | Lee | ............ | 454/184 |
| 2005/0135058 A1 * | 6/2005 | Merlet et al. | ............ | 361/688 |
| 2006/0073783 A1 * | 4/2006 | Tsai et al. | ............ | 454/184 |
| 2006/0285291 A1 * | 12/2006 | Elkins | ............ | 361/695 |
| 2006/0292975 A1 * | 12/2006 | Lin et al. | ............ | 454/184 |
| 2007/0076371 A1 * | 4/2007 | Chou et al. | ............ | 361/690 |
| 2008/0112127 A1 * | 5/2008 | June et al. | ............ | 361/687 |

* cited by examiner

*Primary Examiner*—Jayprakash N Gandhi
*Assistant Examiner*—Anthony Q Edwards
(74) *Attorney, Agent, or Firm*—Frank R. Niranjan

(57) ABSTRACT

A computer case includes a blower, a bracket, and an air outlet defined in the computer case. The blower is received in the bracket, which is fixed outside the computer case. The blower includes an intake and an outlet, which are used to take away the heated air in the computer case. The intake of the blower communicates with the air outlet of the computer case. The computer case with an outside set blower for heat dissipating suits a requirement of heat dissipation of high-power computer systems.

8 Claims, 4 Drawing Sheets

COMPUTER CASE

BACKGROUND

1. Field of the Invention

The present invention relates to computer cases, and particularly to a computer case with a blower for heat dissipating.

2. Description of Related Art

Even as computers become ever smaller they also increase in functionality, and the increasing density of components in computers increase the need for better heat dissipation. Typically, heat dissipation of the computer system is achieved by a system fan. However, this method has become inefficient for dissipating heat in the new modern high-power computer systems.

What is desired, therefore, is a computer case which suits a requirement of heat dissipation in a high-power computer system.

SUMMARY

An exemplary computer case includes an air outlet, a blower configured to draw heated air from within the computer case via the air outlet, and a bracket configured for receiving the blower and mounted together with the blower on the outside of the computer case. The blower includes an intake facing the air outlet and a blower outlet. The heated air comes into the blower through the intake and is expelled through the blower outlet.

Other advantages and novel features will become more apparent from the following detailed description when taken in conjunction with the accompanying drawings, in which:

DETAILED DESCRIPTION

Figure 1:
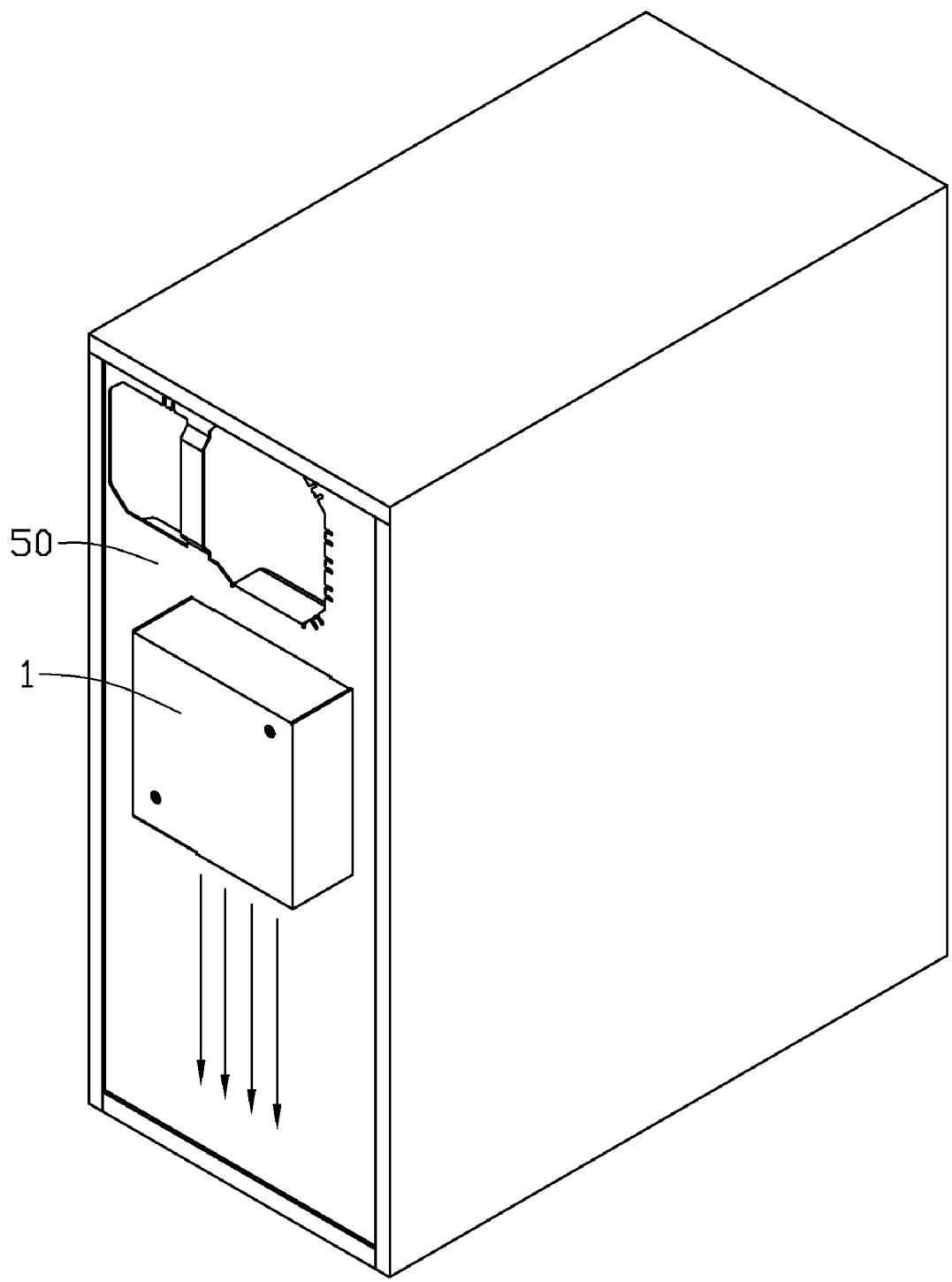
FIG. 1 is an isometric view of a computer case in accordance with an embodiment of the present invention, the computer case including a heat dissipating assembly and a back plate.

Referring to FIG. 1, a computer case 5 in accordance with an embodiment of the present invention includes a heat dissipating assembly 1, and a back plate 50 configured for mounting the heat dissipating assembly 1 thereon.

Figure 2:
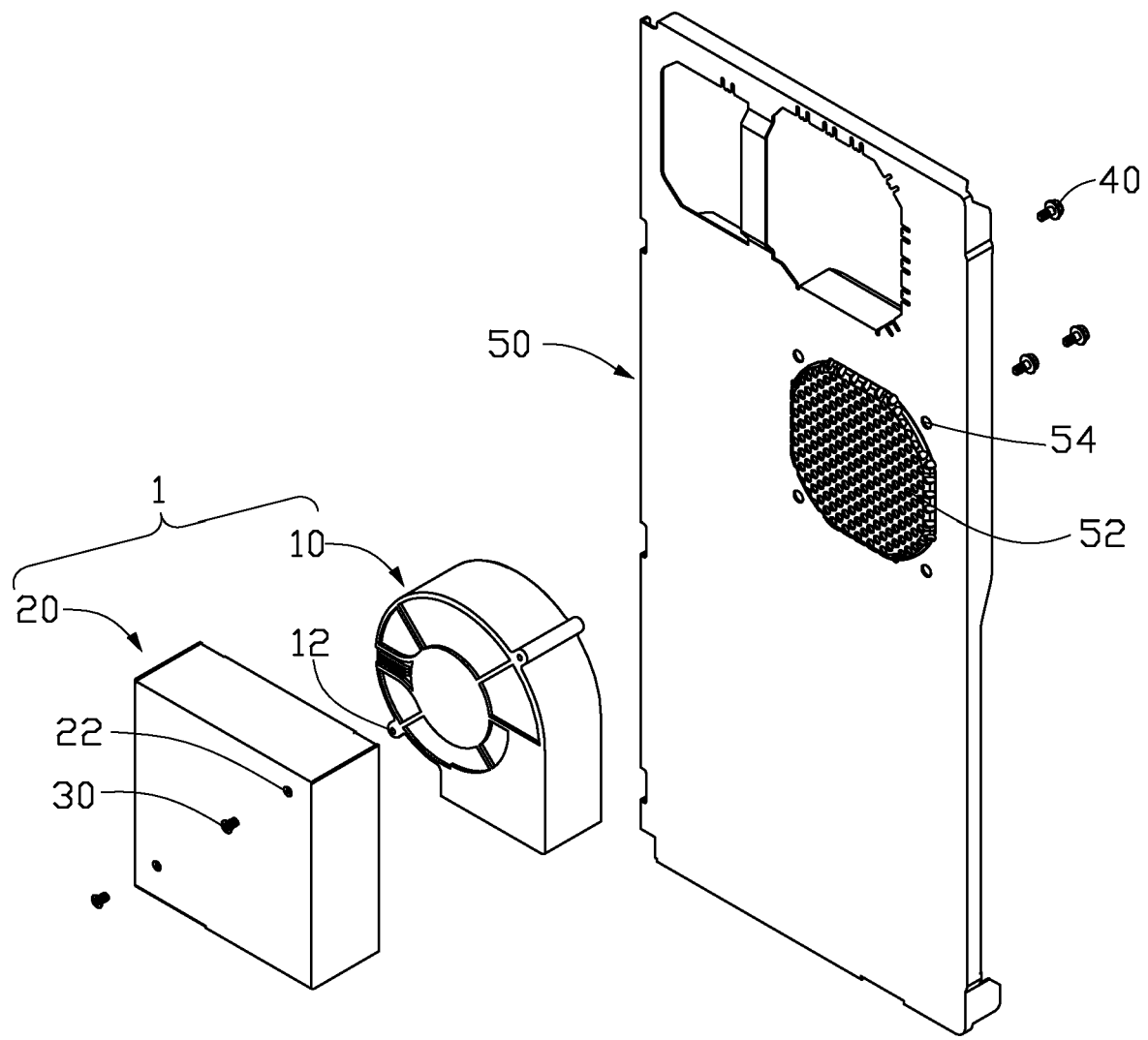
FIG. 2 is an exploded, isometric view of the heat dissipating assembly and the back plate of FIG. 1.

Referring also to FIG. 2, the back plate 50 includes an air outlet 52 with a plurality of heat dissipating holes defined therein, and a plurality of mounting holes 54 defined therearound.

Figure 3:
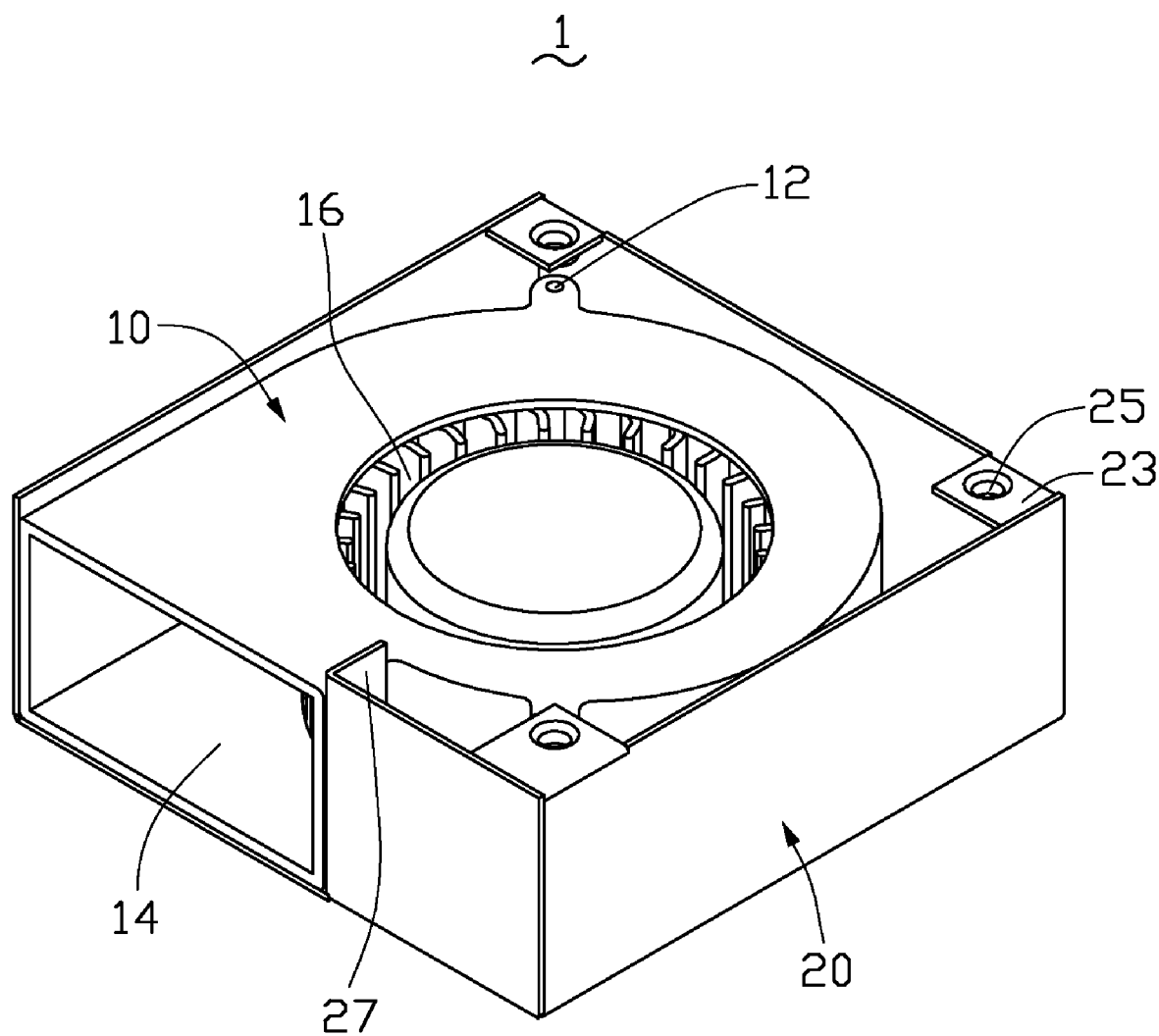
FIG. 3 is an assembled, isometric view of the heat dissipating assembly of FIG. 2.
Figure 4:
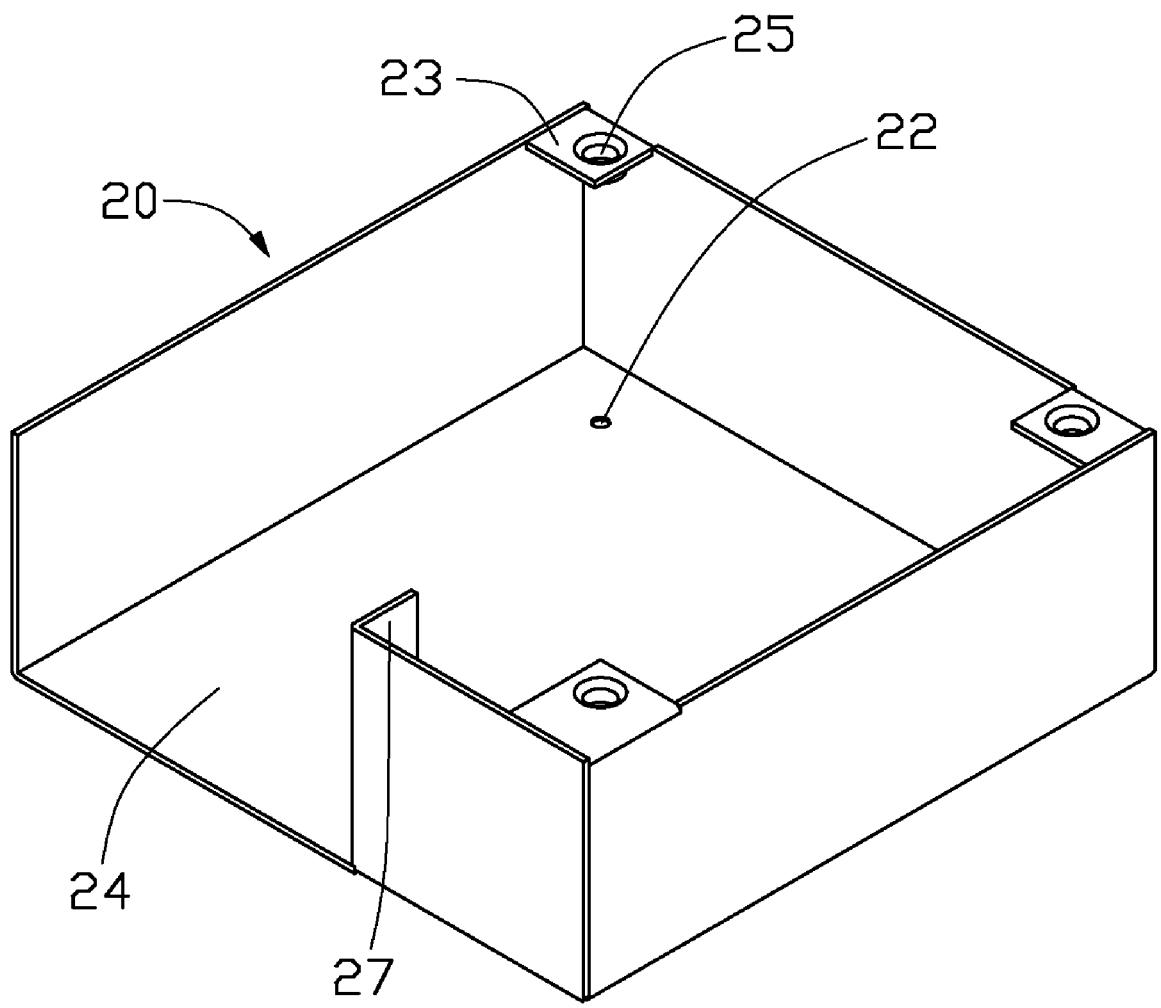
FIG. 4 is an isometric view of a bracket of FIG. 2, but viewed from another aspect.

Referring to FIGS. 3 and 4, the heat dissipating assembly 1 includes a blower 10, and a bracket 20. The blower 10 includes two mounting holes 12 defined in its shell, an outlet 14, and an intake 16. The bracket 20 is configured for receiving and protecting the blower 10, and helps reduce noise leakage. The bracket 20 is box-shaped with an open side and includes a rectangular bottom plate and four sidewalls integrally perpendicularly extending from four edges of the bottom plate. An opening 24 is defined in one of the sidewalls, and a bent portion 27 is bent in from an edge of the one sidewall bounding the opening 24. A tab 23 is formed at a top corner of each two adjoining sidewalls, and a mounting hole 25 is defined in the tab 23. Two mounting holes 22 are defined in the bottom plate.

In assembling the heat dissipating assembly 1, the blower 10 is put into the bracket 20 and fixed in the bracket 20 by two screws 30 inserted through the corresponding holes 22 of the bracket 20 and screwed in the corresponding holes 12 of the blower 10, with the intake 16 of the blower 10 being exposed. The outlet 14 of the blower 10 is aligned with the opening 24 of the bracket 20 and the bent portion 27 of the bracket 20 abuts against a side wall of the blower 10 bounding the outlet 14. In mounting the heat dissipating assembly 1 to the back plate 50, three screws 40 are respectively inserted in the corresponding holes 54 of the back plate 50 and the holes 25 of the bracket 20 in order to mount the heat dissipating assembly 1 to the air outlet 52 at the outside of the computer case 5. The outlet 14 of the blower 10 faces down, and the intake 16 of the blower 10 faces and communicates with the air outlet 52.

In use, heated air from within the computer case 5 is taken out by the heat dissipating assembly 1.

It is believed that the present embodiment and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A computer case, comprising:
    an air outlet communicating with within of the computer case;
    a blower configured to take heated air from within the computer case out via the air outlet, the blower comprising an intake facing and communicating with the air outlet and a blower outlet such that the heated air is capable of coming into the blower through the intake and going out through the blower outlet; and
    a bracket being box-shaped, and comprising a bottom plate and four sidewalls extending perpendicularly from the bottom plate thereby cooperatively defining a space configured for receiving the blower therein, and the bracket mounted together with the blower on the outside of the computer case;
    wherein the bracket comprises an open side opposite to the bottom plate corresponding to the intake of the blower; three tabs respectively extended from three corners of the open side of the bracket: and a mounting hole is defined in each tab.

2. The computer case as claimed in claim 1, wherein the bottom plate of the bracket is parallel to the air outlet of the computer case and is solid, one of the sidewalls of the bracket defining an opening, the blower outlet is placed in said opening.

3. The computer case as claimed in claim 2, wherein the bracket comprises a bent portion bent to the inside of the bracket from an edge of said one of the sidewalls adjacent the opening, and the blower comprises a side wall bounding the blower outlet abutting against the bent portion so that the blower outlet is sandwiched by the bent portion and another one of the sidewalls of the bracket.

4. The computer case as claimed in claim 1, wherein the air outlet is defined in a back plate of the computer case.

5. A computer case comprising:
    a plate comprising an air outlet with a plurality of heat dissipating holes defined therein, the heat dissipating holes communicating with inside and outside of the computer case, the plate defines a plurality Of through holes around the air outlet;

a bracket mounted to the plate, the bracket comprising a mounting wall parallel to the plate and a sidewall extending from a periphery of the mounting wall, the sidewall defining an opening; and a blower mounted to the mounting wall of the bracket and surrounded by the sidewall except the opening, the blower comprising an intake in communication with the air outlet of the plate for taking air from the inside of the computer case via the air outlet, and a blower outlet aligned with the opening for the air to be expelled out;

wherein a plurality of mounting tabs parallel to the plate extend from the sidewall into the inside of the bracket and each of the mounting tabs defines a mounting hole corresponding to one of the through holes to configured to engage with a fastener inserted through the one of the through holes.

6. The computer case as claimed in claim 5, wherein the bracket is box shaped with an open side facing die outlet of the plate and opposing to the mounting wall.

7. The computer case as claimed in claim 5 wherein the mounting wall of the bracket defines a plurality of through holes, and the blower defines a plurality of mounting holes corresponding to the through holes respectively configured to engage with fasteners inserted through the through holes.

8. A computer case comprising:

a plate comprising an air outlet with a plurality of heat dissipating holes defined therein, the heat dissipating holes communicating with inside and outside of the computer case;

a bracket mounted to the plate, the bracket comprising a mounting wall parallel to the plate and a sidewall extending from a periphery of the mounting wall, the sidewall defining an opening; and a blower mounted to the mounting wall of the bracket and surrounded by the sidewall except the opening, the blower comprising an intake in communication with the air outlet of the plate for taking air from the inside of the computer case via the air outlet, and a blower outlet aligned with the opening for the air to be expelled out;

wherein the mounting wall of the bracket defines a plurality of through holes, and the blower defines a plurality of mounting holes corresponding to the through holes respectively configured to engage with fasteners inserted through the through holes.

\* \* \* \* \*